US012762418B2

(12) United States Patent
Anand et al.

(10) Patent No.: US 12,762,418 B2
(45) Date of Patent: Oct. 13, 2026

(54) APPARATUS AND METHODS FOR EXPANDING CLINICAL COHORTS FOR IMPROVED EFFICACY OF SUPERVISED LEARNING

(71) Applicant: Nference, Inc., Cambridge, MA (US)

(72) Inventors: Akash Anand, Bhagalpur (IN); Shashank Jaiswal, Bangalore (IN); Sairam Bade, Ameenabad Anathagiri Suryapet (IN); Rakesh Barve, Bangalore (IN)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/230,477

(22) Filed: Aug. 4, 2023

(65) Prior Publication Data

US 2024/0046109 A1 Feb. 8, 2024

Related U.S. Application Data

(60) Provisional application No. 63/395,063, filed on Aug. 4, 2022.

(51) Int. Cl.
*G06N 3/09* (2023.01)
*G06N 20/00* (2019.01)

(52) U.S. Cl.
CPC ............... *G06N 3/09* (2023.01); *G06N 20/00* (2019.01)

(58) Field of Classification Search
CPC ........... G06N 3/09; G06N 3/045; G06N 20/00
See application file for complete search history.

(56) References Cited

U.S. PATENT DOCUMENTS

| | | | | |
|---|---|---|---|---|
| 11,461,690 | B2 | 10/2022 | Szeto et al. | |
| 2018/0300640 | A1 | 10/2018 | Birnbaum et al. | |
| 2020/0303078 | A1 | 9/2020 | Mayhew et al. | |
| 2020/0388360 | A1* | 12/2020 | Caffarel | G06N 3/04 |
| 2021/0042916 | A1 | 2/2021 | Zhang et al. | |
| 2021/0057098 | A1* | 2/2021 | Mulligan | G16H 40/63 |
| 2021/0090746 | A1 | 3/2021 | Goudey et al. | |
| 2021/0151192 | A1 | 5/2021 | Lucas et al. | |
| 2021/0202045 | A1* | 7/2021 | Neumann | G06N 3/08 |
| 2021/0236080 | A1* | 8/2021 | Herrmann | G06T 7/70 |
| 2021/0312232 | A1* | 10/2021 | Tensmeyer | G06N 3/084 |
| 2021/0342554 | A1* | 11/2021 | Martin | G06F 40/151 |
| 2021/0383900 | A1* | 12/2021 | Telis | G16H 10/20 |
| 2022/0022798 | A1 | 1/2022 | Soon-Shiong et al. | |

(Continued)

OTHER PUBLICATIONS

Lee, Ji Young. Information extraction with neural networks. Diss. Massachusetts Institute of Technology, 2017. (Year: 2017).*

(Continued)

*Primary Examiner* — Sehwan Kim
(74) *Attorney, Agent, or Firm* — CALDWELL LLC

(57) ABSTRACT

An apparatus and method for expanded cohort application of machine-learning classifier methods based on a seed data set. The apparatus comprises at least a processor configured to receive at least a labeled seed set, train an embedding model based on the seed data, determine a plurality of vector representations for both the seed set and the target data, identify commonalities between the seed vector representation and the target vector, and provide the vector training data to a supervised machine-learning application for subsequent classifications.

20 Claims, 7 Drawing Sheets

(56) References Cited

U.S. PATENT DOCUMENTS

| | | | | |
|---|---|---|---|---|
| 2022/0036064 | A1* | 2/2022 | Wang | G06V 40/30 |
| 2022/0093252 | A1 | 3/2022 | Molony et al. | |
| 2022/0121656 | A1* | 4/2022 | Zheng | G06F 16/24522 |
| 2022/0180966 | A1* | 6/2022 | Rabinowitz | G16B 40/20 |
| 2022/0189636 | A1* | 6/2022 | Wagner | G06N 3/08 |
| 2022/0201362 | A1* | 6/2022 | Plug | G06V 20/42 |
| 2022/0223293 | A1* | 7/2022 | Steinberg-Koch | G06N 3/09 |
| 2022/0414463 | A1* | 12/2022 | Mittal | G06N 5/022 |
| 2023/0022030 | A1* | 1/2023 | Kanan | G06V 10/74 |
| 2023/0113092 | A1* | 4/2023 | Abraham | G06N 20/00 706/12 |
| 2023/0123574 | A1* | 4/2023 | Guberman | G06Q 10/10 704/9 |
| 2023/0244987 | A1* | 8/2023 | Truong | G06N 20/00 706/11 |
| 2024/0127385 | A1* | 4/2024 | Megyese | G06F 16/2379 |

OTHER PUBLICATIONS

International Search Report; PCT/US2023/029557; Date: Nov. 8, 2023; By: Authorized Officer Kari Rodriquez.

* cited by examiner

APPARATUS AND METHODS FOR EXPANDING CLINICAL COHORTS FOR IMPROVED EFFICACY OF SUPERVISED LEARNING

CROSS-REFERENCE TO RELATED APPLICATIONS

This application claims the benefit of priority of U.S. Provisional Patent Application Ser. No. 63/395,063 filed on Aug. 4, 2022 and entitled "SYSTEMS AND METHODS FOR EXPANDING CLINICAL COHORTS FOR IMPROVED EFFICACY OF SUPERVISED LEARNING," which is incorporated by reference herein in its entirety.

FIELD OF THE INVENTION

The present invention generally relates to the field of machine-learning. In particular the present invention is directed to an apparatus and method for expanding clinical cohorts for improved efficacy of supervised learning.

BACKGROUND

Large swaths of records, which are currently only marginally useful, contain valuable inferences and data, but based on the methods for storage, interpretation, organization, and recall processes, those records are unable to be used for improved classification and deduction. Inconsistent formats, expensive and time-consuming interrogation, illegible writings, and other interpretation problems preclude effective use of these documents. Even in cases where data is properly formatted for comparison and processing, efforts to organize and extrapolate value from the data are currently human-intensive, and therefore slow, inconsistent, and often unreliable. Even when computer devices are engaged to support this type of digital data value extraction, many data sets are insufficient for the neural network model to converge and achieve the desired level of performance, accuracy, or training efficiency.

SUMMARY OF THE DISCLOSURE

In an aspect, an apparatus for expanded cohort application of machine-learning classifier methods based on a seed data set. The apparatus comprises at least a processor configured to receive at least a labeled seed set, train an embedding model based on the seed data, determine a plurality of vector representations for both the seed set and the target data, identify commonalities between the seed vector representation and the target vector, and provide the vector training data to a supervised machine-learning application for subsequent classifications.

In a separate aspect, a method for expanded cohort application of machine-learning classifier methods based on a seed data set. The method comprises receiving, by the at least a processor, at least a labeled seed set, training, by the at least a processor, an embedding model based on the seed data, determining, by the at least a processor, a plurality of vector representations for both the seed set and the target data, identifying, by the at least a processor, commonalities between the seed vector representation and the target vector, and providing, by the at least a processor, the vector training data to a supervised machine-learning application for subsequent classifications.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
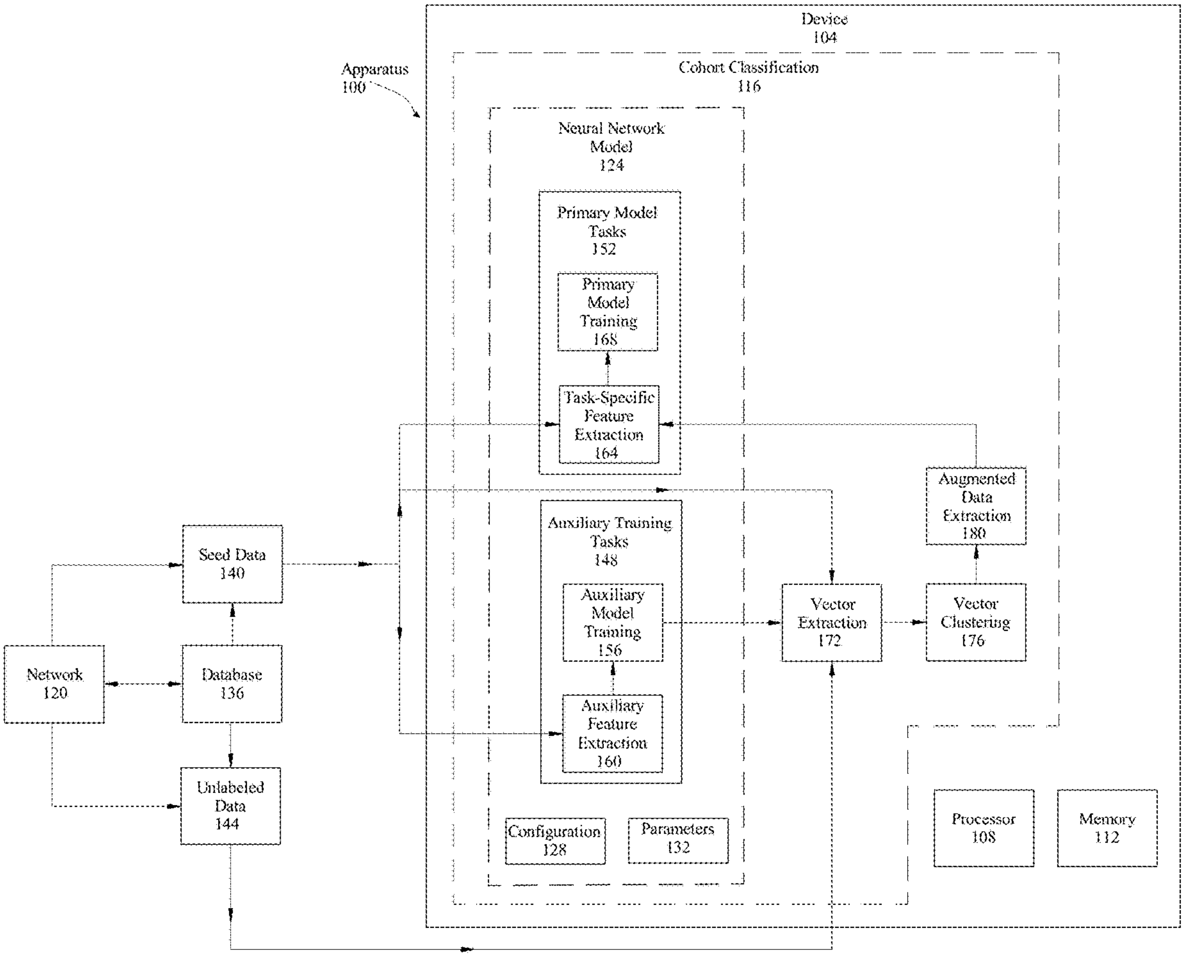
FIG. 1 is a functional block diagram of a system for identifying clinical cohorts according to some embodiments.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for expanded cohort application of machine-learning classifier methods based on a seed data set. The apparatus comprises at least a processor configured to receive at least a labeled seed set, train an embedding model based on the seed data, determine a plurality of vector representations for both the seed set and the target data, identify commonalities between the seed vector representation and the target vector, and provide the vector training data to a supervised machine-learning application for subsequent classifications.

Health records, such as electronic health records (EHRs) and patient charts, provide a vast trove of data that can be exploited for a variety of biomedical applications. However, health records are often represented in an unstructured or semi-structured format, such as the text of a note written by a physician. As a result, it can be challenging to use automated techniques to organize information from health records in a useful way.

Often, it is desirable to identify one or more clinical cohorts in a set of health records. For example, a clinical cohort may include a set of patients that have one or more relevant clinical traits in common, such as patients in a certain age range that have received a common diagnosis. Once identified, a clinical cohort can be used to conduct studies, to train neural network models, or for a variety of other biomedical applications.

Curation of health records to identify clinical cohorts can be performed in several ways, including curation by domain experts, using heuristic algorithms, or a combination thereof (e.g., applying a heuristic filtering algorithm followed by expert validation). However, clinical cohorts identified using these techniques may be unsuitable for certain applications. For example, in some applications, such as when the cohort is used as training data for supervised learning applications, it is desirable for the clinical cohort to be large and/or representative of the overall population. Accordingly, it is desirable to develop improved techniques for curating health records to identify clinical cohorts.

Over the last several years, an increasing amount of clinical patient data has become digitized, and progress has been made in building systems that process clinical patient data in an electronic format. For example, cloud-based systems can collect digitized health records from across institutions (e.g, hospitals, clinics, etc.) and can analyze patient data at a scale that was not attainable until recently. As the amount of data and processing scale increases, there is an emerging need for techniques that can automate the process of organizing and curating health records in a computationally efficient manner.

One exemplary application of large-scale sets of curated health records is to train neural network models using supervised learning techniques. For example, neural network models can be trained for tasks such as early disease risk prediction, patient risk-stratification, and personalized medical decisions.

Identifying large and representative cohorts from a set of patient health records may be challenging. To illustrate, continuing the above example of a neural network that is trained to diagnose a disease, a disease diagnosis may appear in a patient's health record in a variety of ways: the diagnosis may appear in a structured data field, it may be found in unstructured text like a doctor's note, it may be inferred based on a treatment plan prescribed to the patient, or the like. If the process of identifying the cohort of patients diagnosed with the disease is not general enough to account for the different ways that the disease diagnosis appears in the health records, the resulting cohorts may not be sufficiently large or representative to effectively train the neural network model. For example, the use of heuristic algorithms and domain experts to identify cohorts may identify disease diagnoses that appear in structured data fields in a patient's health record, but may miss diagnoses that appear in the unstructured text of a doctor's note. As such, these approaches may omit or misclassify patients such that the resulting cohorts are smaller, less representative, or less accurate than desired.

One technique that may be used to expand an initial clinical cohort (e.g., a cohort identified using heuristic algorithms and domain experts) may be to train a neural network model to identify new cohort members from a larger set of unlabeled patient data with similar features to the patients in the initial clinical cohort. However, this approach is unlikely to identify new cohort members except for those with features similar to those of the initially clinical cohort, hindering generalizability. For example, when the initial clinical cohort is identified using a process that does not sufficiently account for unstructured text of a doctor's note, the trained neural network model is also likely to miss relevant information contained in doctor's notes. Accordingly, it is desirable to develop improved techniques for identifying clinical cohorts, particularly techniques.

Referring now to FIG. 1, an exemplary embodiment of the architecture of apparatus 100 for expanded cohort application. Apparatus 100 includes a plurality of devices, wherein at least one device 104 is communicatively connected to a processor 108. As used herein, a "device" refers to any computing device able to be communicatively connected to a network and able to execute the tasks as described herein. In a non-limiting embodiment, device 104 may be a desktop computer, a mobile device such as a smart cellular phone, a network of devices operating under a shared processing model, or any similarly connected, operational equipment. Device 104 may be instantiated through a single device or as multiple devices, each with identical capabilities and functionality as described within this disclosure. Computing devices are discussed in detail below in reference to FIG. 7. Processor 108 may refer to any computing device as described in this disclosure, including without limitation a microcontroller, microprocessor, digital signal processor (DSP), and/or system on a chip (SoC) as described in this disclosure. Processor 108 may include, be included in, and/or communicate with a mobile device such as a mobile telephone or smartphone. Processor 108 may include a single computing device operating independently, or may include two or more computing devices operating in concert, in parallel, sequentially, or the like; two or more computing devices may be included together in a single computing device or in two or more computing devices. Processor 108 may interface or communicate with one or more additional devices as described below in further detail via a network interface device. Network interface devices are described in detail in reference to FIG. 7 below. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented using a "shared nothing" architecture in which data is cached at the worker, in an embodiment, this may enable the scalability of apparatus 100 and/or processor 108.

With continued reference to FIG. 1, processor 108 may be designed and/or configured to perform any method, method step, or sequence of method steps in any embodiment described in this disclosure, in any order and with any degree of repetition. Configuration of processor 108 is executed by a memory 112, communicatively connected to processor 108. For instance, memory 112 may configure processor 108 to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, memory 112 may contain instructions for cohort classification 116. Cohort classification 116 may be accomplished through machine-learning processes, discussed in detail in reference to FIG. 1 below. This classification relies on supervised training data to apply descriptors to individual or groups of cohort characteristics to enable efficient organization and processing of large amounts of data. Apparatus 100 comprises a plurality of devices, each containing a plurality of data and affiliated metadata. As used herein, the data and metadata contained within the plurality of devices refers to the raw information user intends to classify into a plurality of cohorts. This information may be in the form of documents which have been converted to digital format through scanning, or which currently exist in a digital format. These documents may contain any type of information for which there are accepted classification mechanisms. Depending on the form of capture and upload, metadata may be appended to the data. As used herein, "metadata" refers to the indirect information attached to a digital artifact such as the time and/or location which it was recorded, any data tags or descriptors summarizing the information, formatting information, ownership or affiliations, or any other type of data which may be affixed to digital data. Device 104 may be connected to other devices through a network 120. Network 120 may include one or more local area networks (LANs), wide area networks (WANs), wired networks, wireless networks, the Internet, or the like. Illustratively, device 104 and any other supporting device may communicate over network 120 using the TCP/IP protocol or other suitable networking protocols.

With continued reference to FIG. 1, in some embodiments, network 120 may include a cloud environment. As used in this disclosure, a "cloud environment" is a set of systems and/or processes acting together to provide services in a manner that is dissociated with underlaying hardware and/or software within apparatus 100 used for such purpose and includes a cloud. A "cloud," as described herein, refers to one or more servers that are accessed over the internet. In some cases, cloud may include Hybrid Cloud, Private Cloud, Public Cloud, Community Cloud, any cloud defined by National Institute of Standards and Technology (NIST), and the like thereof. In some embodiments, cloud may be remote to apparatus 100; for instance, cloud may include a plurality of functions distributed over multiple locations external to apparatus 100. Location may be a data center, such as data store described in further detail below. In some embodiments, cloud environment may include implementation of cloud computing. As used in this disclosure, "cloud computing" is an on-demand delivery of information technology (IT) resources within a network through internet, without direct active management by user. In some embodiment, without limitation, cloud computing may include a Software-as-a-Service (SaaS). As used in this disclosure, a "Software-as-a-Service" is a cloud computing service model which makes software available to the user using apparatus 100 directly; for instance, SaaS platform may provide partial or entire set of functionalities of apparatus 100 to user without direct installation of the entire set of functionalities. In another non-limiting example, network 120 may enable one or more documents being created, modified, and/or otherwise saved by users in one or more clouds; for instance, and without limitation, electronic files stored in MICROSOFT 365, DROPBOX, G SUITE, and the like by the user. Processor 104 may extract data from such documents using optical character recognition as described below in this disclosure.

With continued reference to FIG. 1, a neural network model 124 may be employed within device 104 and comprise a configuration 128. "Configuration," as used herein, defines a plurality of layers of neural network model 124 and the relationships among the layers. Illustrative examples of layers include input layers, output layers, convolutional layers, densely connected layers, merge layers, and the like. In some embodiments, neural network model 124 may be configured as a deep neural network with at least one hidden layer between the input and output layers. Connections between layers may include feed-forward connections or recurrent connections. One or more layers of neural network model 124 may be associated with trained model parameters 132. The trained model parameters 132 may include a set of parameters (e.g., weight and bias parameters of artificial neurons) that are learned according to a machine-learning process. During the machine-learning process, labeled training data is provided as an input to neural network model 124, and the values of trained model parameters 132 may be iteratively adjusted until the predictions generated by neural network 124 match the corresponding labels with a desired level of accuracy. For improved performance, processor 108 may execute neural network model 124 using a graphical processing unit, a tensor processing unit, an application-specific integrated circuit, or the like.

Still referring to FIG. 1, device 104 may be communicatively connected to a database 136. For example, database 136 may be configured as a structured database with contents organized according to a schema or other logical relationships (e.g., relational database). In some embodiments database 136 may be configured as a non-relational database, a semi-structured database, an unstructured database, a key-value store, or the like. Database 136 may be directly coupled to device 104 or operate in a variety of other possible arrangements. For example, and without limitation, database 136 may be stored in memory 112, accessed via network 120, or the like. Database 136 may be used to store historic data, labeled seed data sets, any model parameters 132 not currently in use, or any other data which may be relevant and/or applicable in subsequent applications. Database 136 may be implemented, without limitation, as a relational database, a key-value retrieval database such as a NOSQL database, or any other format or structure for use as a database that a person skilled in the art would recognize as suitable upon review of the entirety of this disclosure. Database 136 may alternatively or additionally be implemented using a distributed data storage protocol and/or data structure, such as a distributed hash table or the like. Database 136 may include a plurality of data entries and/or records as described above. Data entries in a database may be flagged with or linked to one or more additional elements of information, which may be reflected in data entry cells and/or in linked tables such as tables related by one or more indices in a relational database. According to some embodiments, device 104 may access a plurality of electronic health records (EHRs) by downloading them from other communicatively connected devices. As used herein, an EHR is a medical record comprising a patient's symptoms, diagnosis, prognosis, evaluation data, communications, historical data, and any other medically relevant data tracked and maintained within a hospital or similar medical organization. In a non-limiting embodiment, an EHR may comprise only a blood pressure check, but in other embodiments, an EHR may comprise a patient's entire medical history including all prescriptions, evaluations, diagnoses, referrals, injuries, or any other medically tracked information. Moreover, one or more of devices may upload or export EHRs to or from device 104. Device 104 may access EHRs multiple times at various intervals (e.g., periodically) to obtain up-to-date records. Seed data 140 and an unlabeled data set 144 may be provided as a direct input to the data flow process, or they may be downloaded from an internet-based search. In a non-limiting embodiment, seed data 140 may be provided based on a medical journal article wherein a specified set of symptoms is recently found to be indicative of a previously unrelated diagnosis. Similarly, unlabeled data 144 may be sourced from an anonymized, online database of medical information and affiliated diagnoses. Both seed data 140 and unlabeled data 144 may be accompanied by metadata. In a non-limiting embodiment, an x-ray scan may appear digitally as only an image, but may include a time and location digital stamp indicating when and where the x-ray was executed. Seed data 140 and unlabeled data 144 may be received through any digitally connected mechanism. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, cohort classification 116 may be implemented using various components and/or features of apparatus 100. Device 104 is configured to receive, at least a seed data 140 of labeled data. As described herein, a "seed set" is a data set that contains information and classification methods structurally analogous to that required in the data to be classified which is already labeled in a manner which user intends to repeat or use as an example or training data. As used herein, "labeled" implies the data is classified and tagged with descriptors that effectively capture and summarize the data contained within seed data 140, including understanding of the data's underlying meaning and utility. In a non-limiting embodiment, a patient with an EHR showing current medical conditions of fever, headache, stiff neck, light sensitivity, drowsiness and seizures may be assigned individual descriptors equating to each symptom. Additionally, the combination of fever, headache, and drowsiness may be assigned a descriptor indicating a viral cold or flu likelihood. Further, a descriptor may be assigned based on the compilation of all of these symptoms indicating a likelihood of meningitis. As used herein, "structurally analogous" is defined as having the organizational and formatting properties sufficiently similar such that the two data sets may be classified using the same protocols and mechanisms. In a non-limiting embodiment, received seed data 140 may comprise EHR, equipment maintenance records, cybersecurity evaluation records, or any type of records which contain data that may support a plurality of diagnoses or generated responses. A labeled EHR may comprise a record where all of the relevant patient symptoms and medical information are digitally captured and classified such that the data is readily available for analysis and processing. Device 104 may receive seed data 140 or other input data which may include a variety of digitized patient healthcare information such as patient data (e.g., name, age, gender, demographics, medical history, etc.), physician's notes, measurement and test results, imaging results, diagnoses, prescriptions, and the like. Illustratively, EHR data can be formatted as text documents, images, videos, database files, other types of digital files (e.g., raw data from medical instruments), or any other suitable format. Input data may be heterogeneous (e.g., of different formats or file types) or homogenous (e.g., of the same format or file type), and can include structured or unstructured data. In some embodiments, such as when device 104 or other affiliated devices are associated with different institutions (e.g., different health care providers), the types and formats of data in EHRs may vary across institutions. For efficient storage and/or transmission via network 120, EHRs may be compressed prior to or during transmission via network 120. Security measures such as encryption, authentication (including multi-factor authentication), SSL, HTTPS, and other security techniques may also be applied. Dual supervised learning applications, auxiliary training tasks 148 and primary model tasks 152, may be executed in coordination. Primary model tasks module 152 is communicatively coupled to an auxiliary cohort identification system, as shown in FIG. 1. As used in this disclosure, "primary model tasks" generally correspond to a program or application that is configured to train a neural network model using supervised learning techniques to apply the auxiliary model cohort identifications to a set of data not yet labeled in a manner recognized by the auxiliary model. For example, primary model tasks 152 can be used to train the neural network model 124 to perform tasks such as early disease risk prediction, patient risk-stratification, and personalized medical decisions. In some embodiments, auxiliary training tasks 148 may include an auxiliary model training module 156 which may receive inputs from an auxiliary feature extraction module 160. Primary model tasks 152 may also include a task-specific feature extraction module 164 and a primary model training module 168. As used herein, "feature extraction" refers to a process of identifying non-domain specific features within an initial data set and isolating those features for subsequent processing. Based on the cohorts identified by the auxiliary model and auxiliary training tasks 148, task-specific feature extraction module 164 may extract features that are relevant to the machine-learning tasks associated with the neural network model. Task-specific feature extraction module 164 may provide the extracted features as training data to primary model training module 168. Primary model training module 168 may use the training data to train the neural network model using supervised learning techniques. Illustrative techniques for training a neural network model using primary model tasks 152 are described in further detail below with reference to machine-learning as described in FIG. 2 and neural networks as described in FIGS. 4-5.

Still referring to FIG. 1, in some embodiments consistent with FIG. 1, auxiliary training tasks 148 may correspond to cohort classification 116. Auxiliary model may include a plurality of modules used to identify cohorts for primary model tasks 152. In some embodiments, auxiliary modules may each be components of an integrated program. In some embodiments, auxiliary modules may be independent programs (e.g., microservices) that operate independently of one another and communicate with each other via programming interfaces. Auxiliary model may be distributed, e.g., in a cloud-computing environment. For increased performance and parallelism, auxiliary model may include multiple instances of any of the individually listed and described modules.

Still referring to FIG. 1, due to the wide variation of potential data input types, processor may implement optical character recognition or optical character reader (OCR), executed by circuitry to automatically convert images of written (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process which is distinct and separate from the auxiliary feature extraction 160 and task-specific feature extraction 164 described below. In some cases, OCR feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2 below. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 4-5 below.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, device 104 uses seed data 140 to train an embedding model based on the seed set 140 of labeled training data. As used herein, an "embedding model" is a program or application that applies a method of classification to preliminarily group inputs into unique orderings to enable more efficient subsequent analysis. Auxiliary training tasks 148, also described as embedding model 148 herein, may operate as an embedding model and extract the relevant features from the seed set in order to build the proper affiliations to be used as training data. Auxiliary training tasks 148 may be used to train an auxiliary model. In some embodiments, the auxiliary model may be trained to make predictions according to the same or similar objective as the model trained using supervised learning application within primary model tasks 152. As part of the training, the auxiliary model may convert seed data 140 to corresponding vector representations, which may be used as embeddings for further processes as described below.

With continued reference to FIG. 1, a "vector" as defined in this disclosure, is a data structure that represents one or more quantitative values and/or measures grouped characteristics within a data set. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more mathematically comparable where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_1^2},$$

where $a_i$ is attribute number i of the vector. Scaling and/or normalization may function to make vector comparison independent of absolute quantities of attributes, while preserving any dependency on similarity of attributes.

Still referring to FIG. 1, in a non-limiting embodiment, converting healthcare data to a vector representation may facilitate quantitative comparison among EHRs that may otherwise have an unstructured and/or inhomogeneous format. In some embodiments, the input data that is converted to a vector representation may include all or a portion of a patient's medical history. For example, the input data may include a patient's medical history over a predetermined time period, e.g., going back a certain number of months or years prior to the present date. Consistent with such embodiments, the input data may be represented as a series of patient events (e.g., diagnoses, tests, office visits, and the like) that are recorded along with a timestamp. In a non-limiting embodiment, a vector representation of an EHR may comprise a distinct subordinate vector representation for each symptom, wherein directionality may be arbitrary so long as each symptom has a unique direction, but magnitude may represent the severity or frequency of the symptom. In this way, a vector representation of an EHR may comprise a matrix of subordinate vectors, each with distinct properties. In this embodiment, each patient's EHR matrix may be unique, but may contain subordinate vectors that are commonly repeated or similar to a large population of other EHR matrices.

As shown in FIG. 1, auxiliary training tasks 148 may include an auxiliary model training module 156 and a feature extraction module 160. As used herein, an auxiliary feature extraction module 160 may identify and abstract the features that are relevant to training the auxiliary model and determining embeddings. Based on seed data provided by seed data module 140, the features extracted by auxiliary feature extraction module 160 may be the same as or different from those extracted by task-specific feature extraction module 164, or there may be partial overlap of features. Device 104 may provide the plurality of first vector representations by both a primary supervised machine-learning application, primary model tasks 152, and an auxiliary supervised machine-learning application, auxiliary training tasks 148, as training data to subsequent operations. Auxiliary feature extraction module 160 may provide the extracted features as training data to auxiliary model training module 156. Auxiliary model training module 156 may use the training data to train the auxiliary model using supervised learning techniques. Illustrative techniques for training an auxiliary model using embedding module 148 are described in further detail below with reference to FIG. 2.

Still referring to FIG. 1, processor is configured to determine, using the embedding model 148, a plurality of first vector representations corresponding to the labeled seed data 140. Labeled training data for supervised learning applications may be obtained from the set of labeled seed data 140. Auxiliary feature extraction 160, operating as an embedding model, extracts the relevant features from seed data 140 in order to build the proper affiliations to be used as training data. Training data, while discussed in detail in reference to FIG. 2 below, may be in the form of user validation of the apparatus' built relationships and affiliations, wherein the machine-learning model then promotes and builds off of the identified relationship. Training data may also be in the form of user rejection of the apparatus' built relationships, wherein the machine-learning model then suppresses the relationships and avoids it in future uses. Device 104 may use an analytical process to incorporate user inputs as training data, wherein the analytical process may include ranking, prioritizing and/or scoring user feedback and affording it a weighted value base on a plurality of factors such as, number of occurrences of a given type of feedback.

In a non-limiting embodiment, the labeled seed data 140 may comprise a set of health records with already identified cohorts, e.g., clinical patient data associated with patients that share one or more common attributes. For example, a first cohort may include patients that have been diagnosed with a particular disease, and another cohort may include a control group of patients that were not diagnosed with that disease. These cohorts may be used as labeled training data to train a neural network model to predict, for example, whether a given patient is likely to be diagnosed with the disease. In this example, the input to the neural network model may be the health records of the patients within each of the cohorts, or information extracted from the health records, and the labels used for training may include the identification of which cohort each patient belongs to (e.g., whether a patient was or was not diagnosed with the disease).

Still referring to FIG. 1, seed data module 140 may provide an initial identification of one or more cohorts based on the embedded data and corresponding characteristics contained within the data. For example, an initial identification of clinical cohorts may be performed by domain experts, using heuristic algorithms, or the like. In some embodiments, the initial clinical cohorts from seed data module 140 may be provided as seed data (e.g., data that has been tagged in accordance with the machine-learning task) to primary model tasks 152. Based on the seed data 140, primary model tasks 152 may perform initial supervised training of the neural network model 124.

Still referring to FIG. 1, processor 108 is configured to next determine, using the embedding model 148, a plurality of second vector representations corresponding to an unlabeled set of data 144. As used herein, unlabeled data module 144 is a set of data for which cohorts have not been identified, e.g., the data has not been tagged in accordance with the machine-learning task. Auxiliary model may be used to expand the cohorts provided by seed data module 140 to include additional data sets with the desired attributes from unlabeled data module 144. In some embodiments consistent with FIG. 1, the data provided by unlabeled data module 144 may generally correspond to provided seed data 140 types of information. In a non-limiting embodiment, unlabeled data 144 may include a variety of data types (e.g., doctor's notes, test results, prescription information, etc.), formats (unstructured, structured, image/video, time-series data, etc.), and may originate from one or more different institutions. In some embodiments, unlabeled data 144 may be de-identified to remove information that could be used to identify individual patients or redact otherwise unnecessary or private information.

Still referring to FIG. 1, a vector extraction module 172 may apply the embeddings determined by auxiliary training tasks 148 to data from seed data module 140 and unlabeled data module 144. In this manner, labeled data (e.g., data from seed data module 140 for which cohorts have been identified) and unlabeled data (e.g., data from unlabeled data module 144 for which cohorts have not been identified) may each be mapped to the same vector space by vector extraction module 172. In some embodiments, the number of vectors determined for unlabeled data 144 may outnumber the number of vectors determined for labeled seed data 140 (e.g., by a factor of 10×, 100×, or more). As for seed data 140, unlabeled data 144 may also be extracted using OCR methods, as described above. Vector extraction 172 may rely on machine-learning processes to use historical vector extractions, labeled seed data, and user feedback as training data to extract and assess the data vectors.

Still referring to FIG. 1, processor 108 is configured to next identify one or more first data sets from the unlabeled set as being structurally analogous to one or more second data sets from the seed set based on the respective vector representations of the one or more first data sets and the one or more second data sets. As used herein, "first data set" refers to a plurality of unlabeled data 144 which user intends to identify additional cohorts, while "second data set" refers to previously labeled data which user has deemed satisfactory and applicable to subsequent data sets. In a non-limiting embodiment, second data set may refer to a group of patients diagnosed with atrial fibrillation, while the first data set may refer to a group of randomly identified patients with varying conditions, but where all patients from both data sets share a similar quantity and formatting of data within their medical records. In a separate non-limiting embodiment, a second data set may consist of audit results which all identified a set of tax document submissions with excessive employment-related deductions, while a first data set contains a plurality of individual tax documents which are set to be audited, but do not yet have any type of evaluation associated with them. To accomplish this congruent vector application, a vector clustering module 176 and an augmented data extraction module 180 may use the vectors generated by vector extraction module 172 to identify expanded cohorts. As used herein, a "vector clustering module" is an application capable of correlating vector representations based on their scalar magnitude and directional attributes based on a similarity threshold comparison. An "augmented data extraction module", as used herein, may accept the vector representations from vector clustering module 176 and apply the vector representations to the unlabeled data 144 based on a separate threshold analysis to output a set of previously unlabeled data with labels correlating to those identified from seed data 140. Vector clustering module 176 may apply new cohort classifiers to unlabeled data set 144 based on mathematically comparable vector representation grouping mechanisms. As used in this disclosure, "mathematically comparable vector representation grouping mechanisms" refers to software encoded processes that assess the vector representations based on mathematical comparisons. Vector clustering module 176 may use the embedding module 148 to apply similarity metrics to match unlabeled data sets 144 based on the labeled seed data set 140 similarity metrics. In a non-limiting embodiment, an expanded cohort may include patients from the unlabeled data set 144 with structurally comparable attributes to patients that have already been assigned to a given cohort within seed data 140. Vector clustering 176 may accomplish this by executing one or more clustering algorithms, such as K-means clustering, to identify clusters of vectors in the shared vector space. For each of the clusters identified by vector clustering module 176, an augmented data extraction module 180 may calculate a centroid associated with the vectors corresponding to seed data 140. Augmented data extraction module 180 may then compute a similarity metric (e.g., cosine similarity) to identify vectors corresponding to unlabeled data 144 that are closest to the centroid. For example, augmented data extraction module 180 may select the N nearest unlabeled data to the centroid and add them to the expanded cohort, and/or may add unlabeled data 144 that are within a predetermined threshold distance (according to the similarity metric) of the centroid.

Still referring to FIG. 1, processor 108 is configured to provide the one or more first data sets as labeled training data to the supervised machine-learning application. Upon completion of vector extraction 172 and vector clustering 176 processes by the auxiliary training tasks 148 to define new cohorts generated from unlabeled data sets 144 based on the labeled seed data set 140 similarity metrics may be implemented with the primary cohort identifier, primary model tasks 152. As used herein, "primary cohort identifier" refers to a digital model that applies the training data and cohort classification methods identified by the auxiliary model as described above. Within this disclosure, primary model tasks 152 operate as the embodiment of the described primary cohort identifier. The additional data sets in the expanded cohort may then be provided (in addition to or instead of seed data 140) as training data to primary model tasks 152. In this way, primary model tasks module 152 may be able to aggregate and apply training data from seed data 140, unlabeled data 144, and any user inputs in order to optimize its effectiveness.

Still referring to FIG. 1, processor 108 may rely on a neural network and use supervised learning techniques independently or interconnected with a plurality of other devices. In a non-limiting embodiment, the neural network model 124 within each device may be trained for tasks such as early disease risk prediction, patient risk-stratification, and personalized medical decisions. Labeled training data for supervised learning applications can be obtained from a set of health records by identifying cohorts, e.g., clinical patient data associated with patients that share one or more desired attributes. For example, a first cohort may include patients that have been diagnosed with a particular disease, and another cohort may include a control group of patients that were not diagnosed with that disease. These cohorts can be used as labeled training data to train a neural network model to predict, for example, whether a given patient is likely to be diagnosed with the disease. In this example, the input to the neural network model may be the health records of the patients within each of the cohorts, or information extracted from the health records, and the labels used for training may include the identification of which cohort each patient belongs to (e.g., whether a patient was or was not diagnosed with the disease). The effectiveness of supervised learning can depend on the quantity and quality of training data that is provided to the model. Larger and more representative sets of training data can improve the accuracy of the neural network model, their generalizability, and the efficiency with which they are trained. For example, a large and representative set of training data may improve various performance metrics associated with the model, such as prediction accuracy, precision, recall, or the like, and may reduce the number of graphics processing unit (GPU) cycles used during training. It may also reduce the size (e.g., number of nodes) of the neural network model to achieve the desired accuracy, which in turn may reduce the storage capacity used to store the model and its parameters and the bandwidth used to transmit the model and its parameters.

Still referring to FIG. 1, these processes are illustrative and various other approaches may be used to identify the proximity between the unlabeled and labeled vectors and to add unlabeled vectors to the expanded clinical cohort based on the proximity. In a non-limiting embodiment, vector clustering 176 and augmented data extraction 180 may rely on fuzzy set comparisons to perform the threshold analyses and matching process. Fuzzy sets are discussed in detail in reference to FIG. 3 below.

Still referring to FIG. 1, processor 108 may be used to further identify new groupings based on peer-reviewed innovations. As used herein, "peer-reviewed innovations" refers to any new methods of correlating data to produce more informed, accurate, reliable, efficient or generally better results. These peer-reviewed innovations may be sourced from medical journals, expert reviews, laboratory discoveries, or other scientifically trusted process. In a non-limiting embodiment, processor may be used to augment efforts in early disease risk prediction, patient-risk stratification, and personalized medical decisions, as well as any other efforts wherein data classification based on both known and yet-to-be identified affiliations between raw data sets and informed decisions is not fully defined. Each identified cohort and analysis performed by device 104 may be subject to user feedback. User feedback may be in the form of a binary approval or disapproval, a continuous numerical assessment, or any variation wherein a user is able to approve, reject, or bias future operations based on the user's assessment of the classification and results. User feedback may be used as training data, which is described in detail below, to modify and correct subsequent operations.

Figure 2:
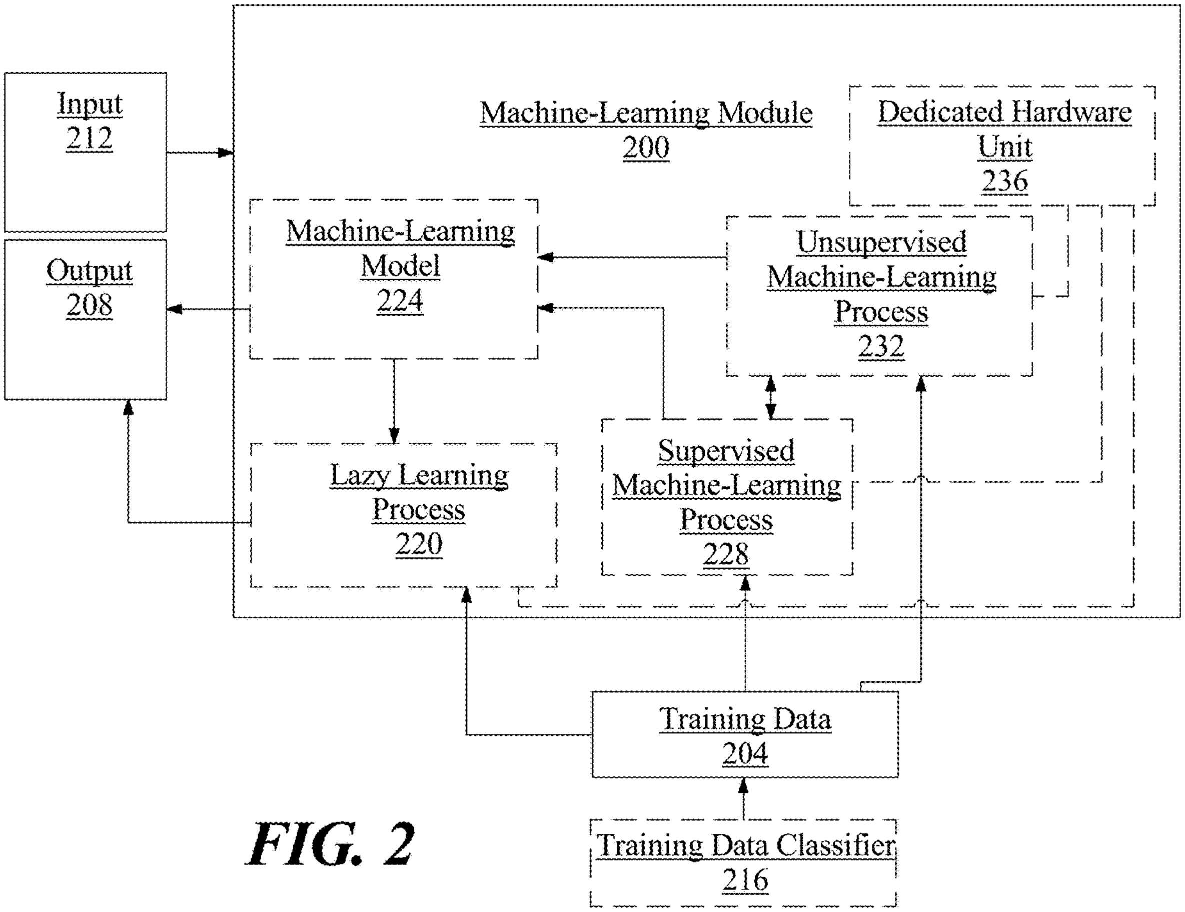
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine-learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a set of labeled seed data may be used as inputs to identify the affiliations relied upon for the seed data labels, then those affiliations may be used as training data to be applied to an unlabeled data set.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a certain type of patient or illness, wherein the sub-population of certain patients or illnesses is based on a set of symptoms or observed characteristics that distinguishes them from the entire patient population.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include labeled seed data, as described above as inputs, vector clustering, as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine-learning processes may include at least an unsupervised machine-learning processes 232. An unsupervised machine-learning process, as used herein, is a process that derives inferences in data sets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired"

results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
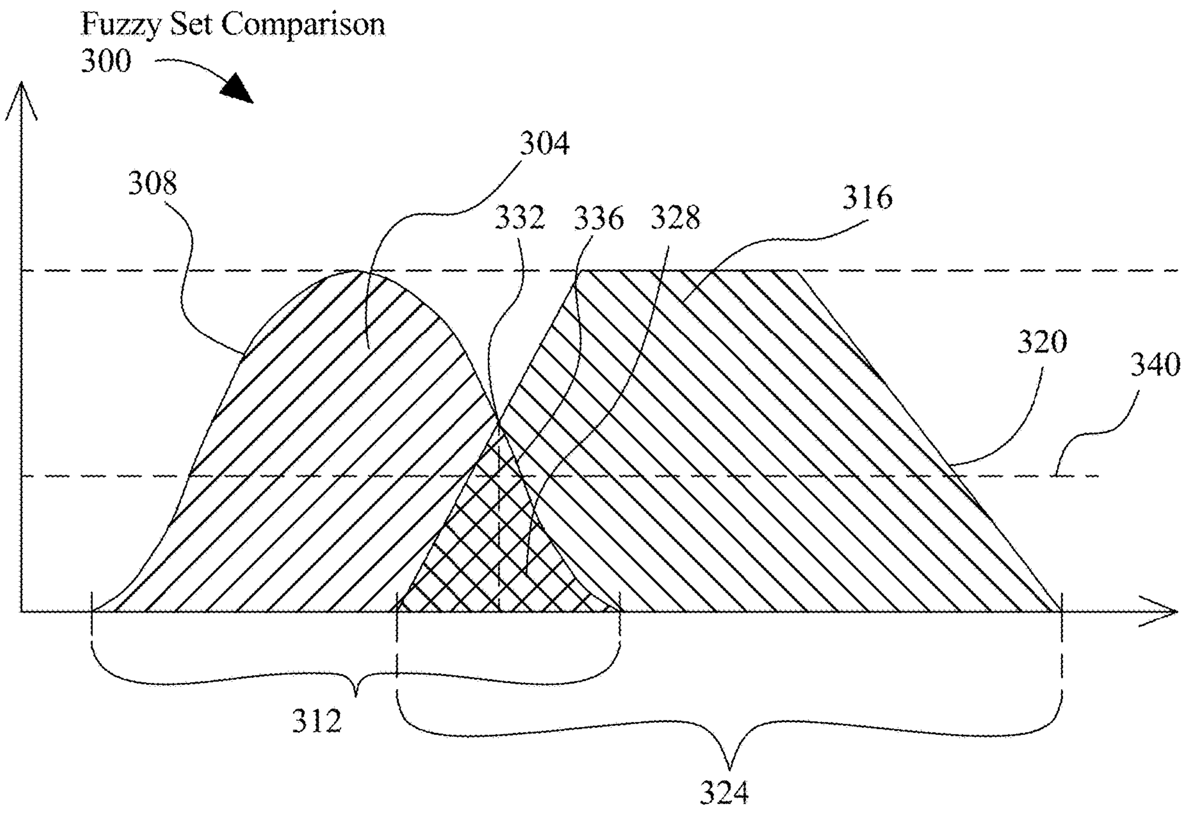
FIG. 3 is an exemplary embodiment of a fuzzy set comparison.

Referring now to FIG. 3, an exemplary embodiment of fuzzy set comparison 300 is illustrated. In a non-limiting embodiment, fuzzy sets may be used to analyze and correlate unlabeled data with prior identified cohort classification mechanisms. A first fuzzy set 304 may be represented, without limitation, according to a first membership function 308 representing a probability that an input falling on a first range of values 312 is a member of the first fuzzy set 304, where first membership function 308 has values on a range of probabilities such as without limitation the interval [0,1], and an area beneath first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models, a predetermined class, such as without limitation, a set of patients and their affiliated EHRs which may disclose symptoms of a brain tumor. A second fuzzy set 316, which may represent any value which may be represented by first fuzzy set 304, may be defined by a second membership function 320 on a second range 324; second range 324 may be identical and/or overlap with first range 312 and/or may be combined with first range 312 via Cartesian product or the like to generate a mapping permitting evaluation overlap of first fuzzy set 304 and second fuzzy set 316. Continuing the non-limiting embodiment where first fuzzy set 304 may be a set of patient data which may contain certain symptoms, second fuzzy set 316 may be a set of specific conditions known to be indicative of a brain tumor. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between a set of patient data and the specified set of brain tumor symptoms for combination to occur as described above, thereby indicating a strong likelihood of the patient having a brain tumor condition. Alternatively or additionally, each threshold may be tuned by a machine-learning process.

Figure 4:
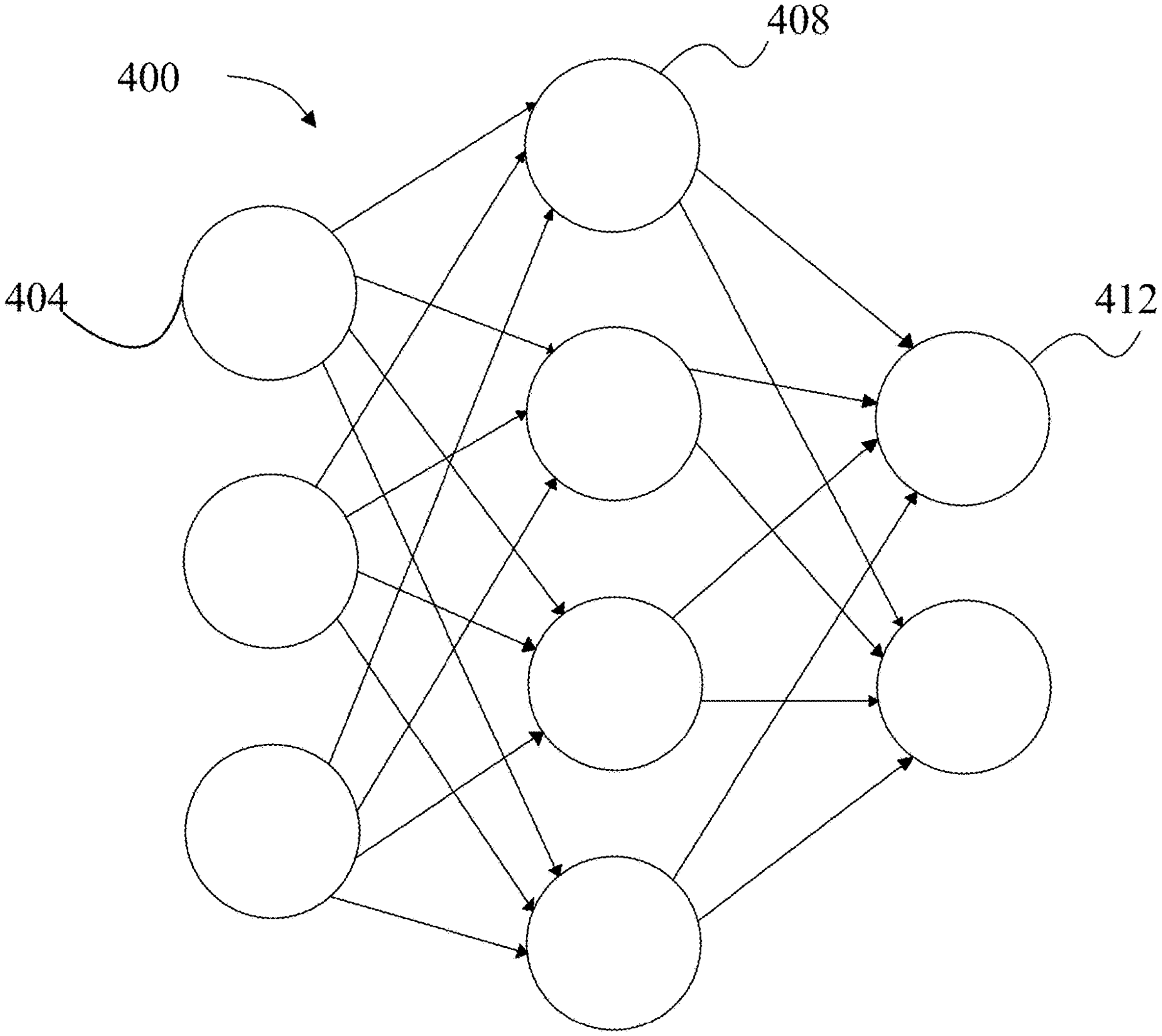
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
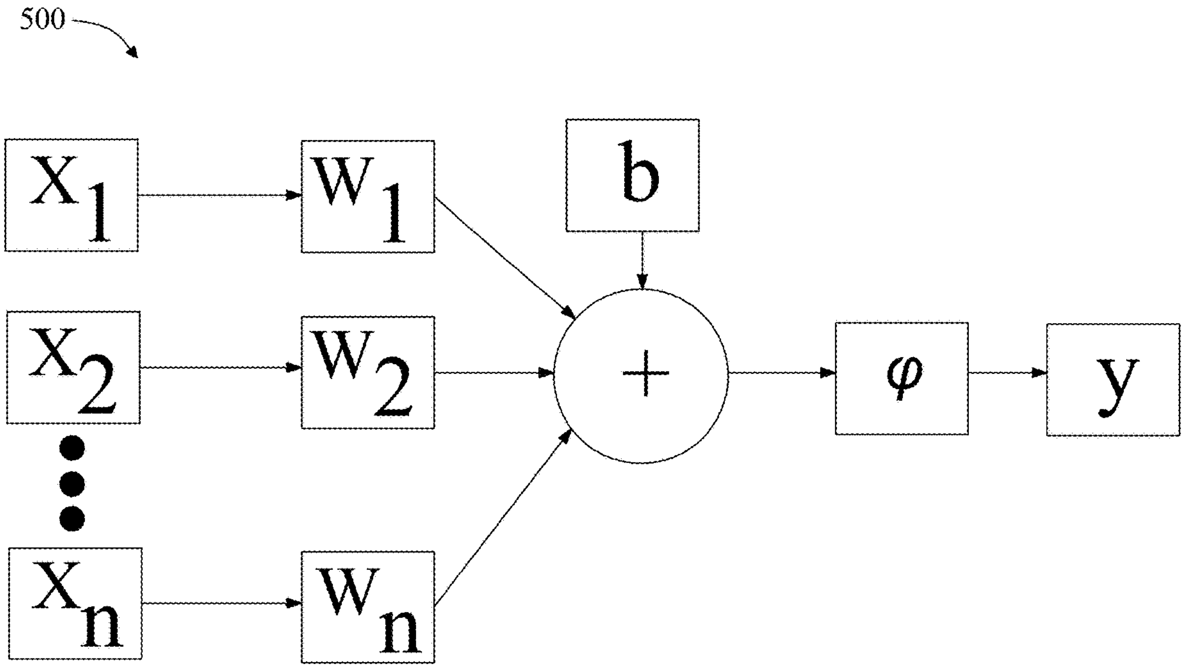
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as f(x)=max (0, x), a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
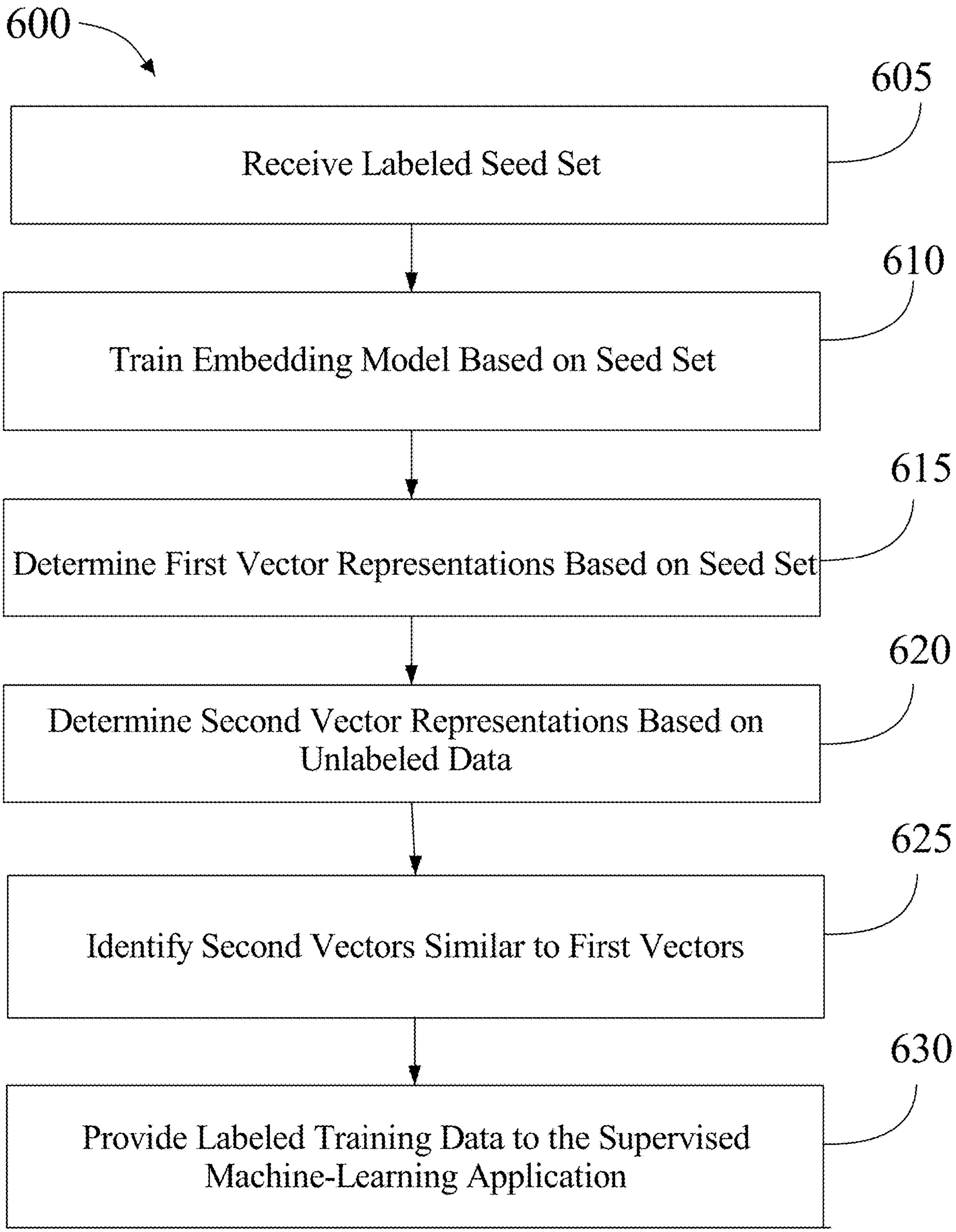
FIG. 6 is a flow diagram of an exemplary method for expanded cohort classification.

Referring now to FIG. 6, a simplified diagram of a method 600 for identifying and expanding cohorts according to some embodiments is shown. According to some embodiments consistent with FIGS. 1-5, method 600 may be performed by processor 108 during the execution of cohort classification 116.

Still referring to FIG. 6, at step 605, method 600 includes receiving a labeled seed set. In a non-limiting embodiment, seed set may contain EHRs associated with one or more preliminary clinical cohorts. For example, the seed set of EHRs may be received from a seed data. The seed set of EHRs may be associated with one or more tags, labels, or other indicators of the one or more preliminary clinical cohorts associated with the seed set. As described above, the EHRs may include various types of patient data in various formats and/or data structures. As further described above, the grouping of the EHRs into the preliminary cohorts may be performed using techniques such as heuristic algorithms, manual review by domain experts, or the like. This may be implemented, without limitation, as described above with reference to FIGS. 1-5.

Still referring to FIG. 6, at step 610, method 600 includes training an embedding model based on the received seed set. In a non-limiting embodiment, embeddings may be learned based on the seed set of EHRs. In some embodiments, learning the embeddings may include extracting features from the seed set of EHRs and training an auxiliary model based on the extracted features. As part of training the auxiliary model, input patient data may be converted to vector representations, and these learned representations may be used as embeddings. This may be implemented as described and with reference to FIGS. 1-5.

Still referring to FIG. 6, at step 615, method 600 includes determining a first vector representation base on the received seed set. Continuing with the non-limiting embodiment from the previous step, the embeddings, as described therein, correspond to vector representations of the EHRs (e.g., n-dimensional vectors where the length of a vector along each dimension is represented by a numerical value). This may be implemented as described and with reference to FIGS. 1-5.

Still referring to FIG. 6, at step 620, method 600 includes determining a second vector representation based on the unlabeled data set. Continuing with the non-limiting embodiment from the previous steps, the learned embeddings are used to determine vector representations of available, unlabeled EHRs. For example, vector representations corresponding to the seed set of EHRs may be determined based on the learned embeddings. Vector representations corresponding to an unlabeled set of EHRs may be determined based on the learned embeddings. In this manner, labeled data from the seed set and unlabeled data from the unlabeled set are each mapped to a shared vector space. This may be implemented as described and with reference to FIGS. 1-5.

Still referring to FIG. 6, at step 625, method 600 includes identifying a plurality of second vectors similar to a plurality of identified first vectors. Continuing with the non-limiting embodiment from the previous steps, one or more EHRs from the unlabeled set are identified as being similar to one or more EHRs from the seed set based on the respective vector representations. In general, records are identified as being similar when their vector representations are determined to be close to each other in the shared vector space, e.g., based on a similarity metric computed in the shared vector space. This may be implemented as described and with reference to FIGS. 1-5.

Still referring to FIG. 6, at step 630, method 600 includes providing the labeled training data to the supervised machine-learning application for subsequent application of the training data to new unlabeled data sets. This same process may be repeatedly used to re-evaluate previously labeled data sets by applying different seed sets and different training data to identify new cohorts. This may be implemented as described and with reference to FIGS. 1-5.

Any one or more of the aspects and embodiments described herein may be implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
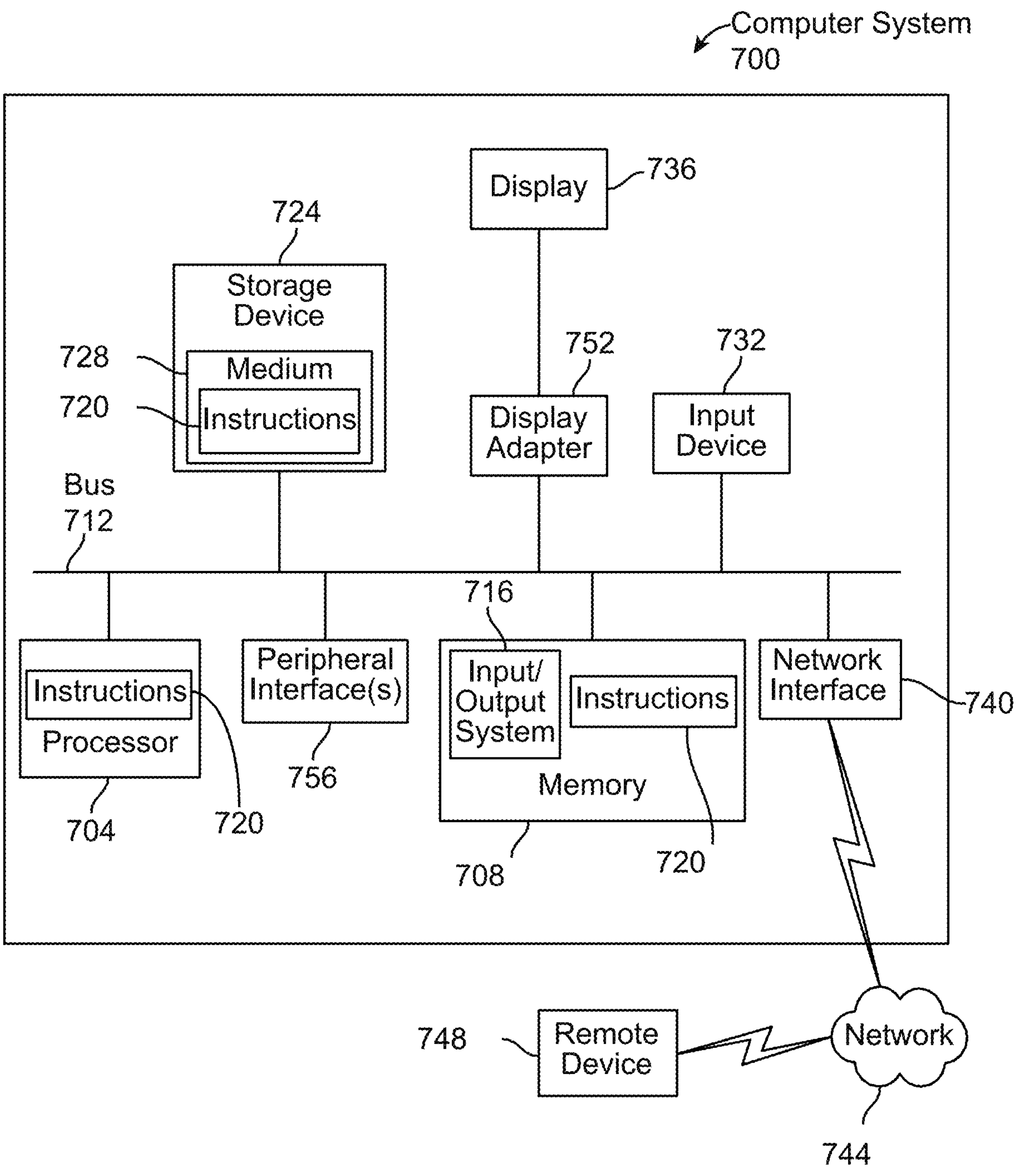
FIG. 7 is a block diagram of a computer device that can be used to implement any one or more of the methodologies disclosed herein and any one or more portions thereof.

Referring now to FIG. 7, a diagrammatic representation of one embodiment of a computing device in the exemplary form of a computer system 700 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), FPGA, Complex Programmable Logic Device (CPLD), GPU, general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for cohort identification using machine-learning based on a seed data set and an unstructured data set to train a supervised machine learning model, wherein the apparatus comprises:

at least a processor;

a database; and a memory communicatively connected to the at least a processor, wherein the apparatus comprises a neural network, wherein the memory contains instructions configuring the at least a processor to:

receive at least a seed set of labeled data from the database, wherein the at least a seed set of labeled data contains information and classification methods, wherein the information is structurally analogous to information required in data to be classified, wherein the at least a seed set of labeled data comprises electronic health record data;

identify and abstract, using an auxiliary feature extraction module, first features associated with the at least a seed set of labeled data, wherein the first features are associated with at least one of: training and determining embeddings;

extract, using a task-specific feature extraction module operably responsive to the auxiliary feature extraction module, second features from the at least a seed set of labeled data, wherein the second features are associated with a machine-learning task associated with the neural network;

wherein feature extraction is associated with identifying non-domain specific features and isolating such features for processing;

initialize the supervised machine learning model using the second features;

train an embedding model based on the at least a seed set of labeled data and the first features, wherein training the embedding model comprises:

adjusting connections and weights between nodes in adjacent layers of the embedding model;

determine, using the embedding model, a plurality of first vector representations corresponding to the at least a seed set of labeled data;

determine, using the embedding model, a plurality of second vector representations corresponding to an unlabeled set of data;

map the plurality of first vector representations and the plurality of second vector representations within a shared vector space;

identify at least one first data set from the unlabeled set of data having a predetermined distance to at least one second data set from the at least a seed set of labeled data based on the respective vector representations of the at least one first data set and the at least one second data set within the shared vector space;

assign labels to the at least one first data set with same labels associated with the at least one second data set;

increase a size of a training data set for the supervised machine-learning model by providing the at least one first data set and the labels as labeled training data to the supervised machine-learning model; and train the supervised machine-learning model using the labeled training data to increase an accuracy of the supervised machine-learning model.

2. The apparatus of claim 1, wherein receiving the at least a seed set of labeled data comprises extracting and labeling data using an internet-based search and preexisting metadata.

3. The apparatus of claim 1, wherein determining the plurality of second vector representations corresponding to the unlabeled set of data comprises using optical character recognition to extrapolate at least a portion of a contained data.

4. The apparatus of claim 1, wherein training the embedding model comprises using an analytical process to incorporate user inputs as training data.

5. The apparatus of claim 1, wherein providing the at least one first data set as the labeled training data comprises providing the at least one first data set to the neural network.

6. The apparatus of claim 1, wherein determining the plurality of first vector representations corresponding to the at least a seed set of labeled data comprises determining the plurality of first vector representations using an auxiliary supervised machine-learning model.

7. The apparatus of claim 1, wherein identifying the at least one first data set from the unlabeled set of data comprises applying a plurality of new cohort classifiers to the unlabeled set of data based on a mathematically comparable vector representation grouping mechanism.

8. The apparatus of claim 7, wherein the mathematically comparable vector representation grouping mechanism is configured to:

generate similarity metrics by comparing each first vector representation of the plurality of first vector representations with each second vector representation of the plurality of second vector representations; and identify the at least one first data set from the unlabeled set of data by matching the at least one first data set to the at least one second data set as a function of the similarity metrics.

9. The apparatus of claim 8, wherein the memory further comprises instructions configuring the at least a processor to:

train a primary cohort identifier model by correlating a labeled seed set cohort with the unlabeled set of data based on similarity thresholds using a vector extraction and a vector clustering process;

implement correlations for the labeled training data;

accept, by an augmented data extraction module, the plurality of second vector representations; and apply the plurality of second vector representations to the unlabeled set of data.

10. The apparatus of claim 1, wherein identifying the at least one first data set from the unlabeled set of data as having a structurally analogous relationship to the at least one second data set from the at least a seed set of labeled data comprises identifying new groupings.

11. A method for machine-learning using a seed data set and an unstructured data set to train a supervised machine-learning model, wherein the method comprises:

receiving, by at least a processor from a database, at least a seed set of labeled data, wherein the at least a seed set of labeled data contains information and classification methods, wherein the information is structurally analogous to information required in data to be classified, wherein the at least a seed set of labeled data comprises electronic health record data, using a neural network;

identifying and abstracting, by an auxiliary feature extraction module, first features associated with the at least a seed set of labeled data, wherein the first features are associated with at least one of: training and determining embeddings;

extracting, by a task-specific feature extraction module, in response to the auxiliary feature extraction module, second features from the at least a seed set of labeled data, wherein the second features are associated with a machine-learning task associated with the neural network;

wherein feature extraction is associated with identifying non-domain specific features and isolating such features for processing;

initializing the supervised machine learning model using the second features;

training, by the at least a processor, an embedding model based on the at least a seed set of labeled data and the first features, wherein training the embedding model comprises:

adjusting connections and weights between nodes in adjacent layers of the embedding model;

determining, by the at least a processor and using the embedding model, a plurality of first vector representations corresponding to the at least a seed set of labeled data;

mapping, using the at least a processor, the plurality of first vector representations and the plurality of second vector representations within a shared vector space;

determining, by the at least a processor and using the embedding model, a plurality of second vector representations corresponding to an unlabeled set of data;

identifying, by the at least a processor, at least one first data set from the unlabeled set of data as having a predetermined distance to at least one second data set from the at least a seed set of labeled data based on the respective vector representations of the at least one first data set and the at least one second data set within the shared vector space;

assigning, by the at least a processor, labels to the at least one first data set with same labels associated with the at least one second data set;

increasing, by the at least a processor, a size of a training data set for the supervised machine-learning model by providing the at least one first data set and the labels as labeled training data to the supervised machine-learning model; and training, by the at least a processor, the supervised machine-learning model using the labeled training data to increase an accuracy of the supervised machine-learning model.

12. The method of claim 11, wherein receiving the at least a seed set of labeled data comprises extracting and labeling, by the at least a processor, data using an internet-based search and preexisting metadata.

13. The method of claim 11, wherein determining the plurality of second vector representations corresponding to the unlabeled set of data comprises using optical character recognition to extrapolate, by the at least a processor, at least a portion of a contained data.

14. The method of claim 11, wherein training the embedding model comprises using an analytical process to incorporate, by the at least a processor, user inputs as training data.

15. The method of claim 11, wherein providing the at least one first data set as the labeled training data comprises providing, by the at least a processor, the at least one first data set to the neural network.

16. The method of claim 11, wherein determining the plurality of first vector representations corresponding to the at least a seed set of labeled data comprises determining, by the at least a processor, the plurality of first vector representations using an auxiliary supervised machine-learning model.

17. The method of claim 11, wherein identifying one or more first data set from the unlabeled set of data comprises applying, by the at least a processor, a plurality of new cohort classifiers to the unlabeled set of data based on a mathematically comparable vector representation grouping mechanism.

18. The method of claim 17, wherein the mathematically comparable vector representation grouping mechanism is configured to:

generate, by the at least a processor, similarity metrics by comparing each first vector representation of the plurality of first vector representations with each second vector representation of the plurality of second vector representations; and identify, by the at least a processor, the at least one first data set from the unlabeled set of data by matching the at least one first data set to the at least one second data set as a function of the similarity metrics.

19. The method of claim 18, wherein the method further comprises steps of:

training a primary cohort identifier model by correlating, by the at least a processor, a labeled seed set cohort with the unlabeled set of data based on similarity thresholds using a vector extraction and vector clustering process;

implementing, by the at least a processor, correlations for the labeled training data;

accepting, by an augmented data extraction module, the plurality of second vector representations; and applying the vector representations to the unlabeled set of data.

20. The method of claim 11, wherein identifying the at least one first data set from the unlabeled set of data as having a structurally analogous relationship to the at least one second data set from the at least a seed set of labeled data comprises, by the at least a processor, identifying new groupings.

* * * * *